Oct. 30, 1962    M. A. HASS    3,060,576
STABILIZING ARTIFICIAL TOOTH
Filed Jan. 27, 1958
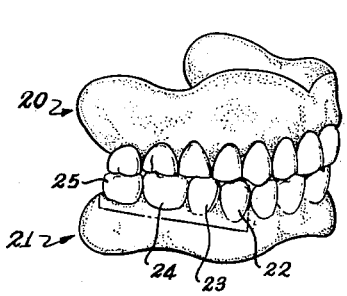
Fig. 1
Fig. 2
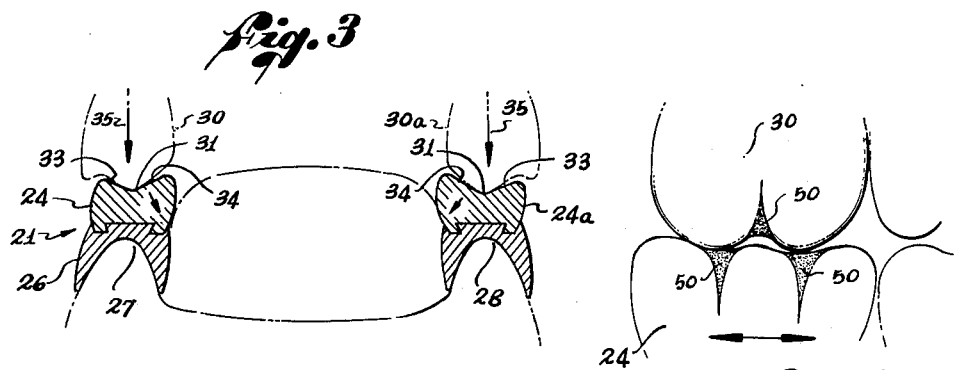
Fig. 3    Fig. 5
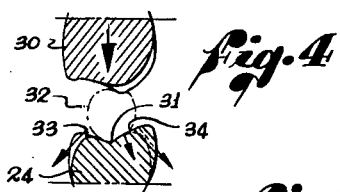
Fig. 4
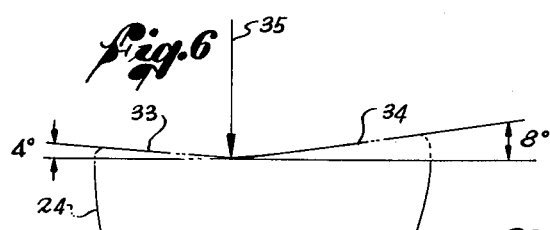
Fig. 6
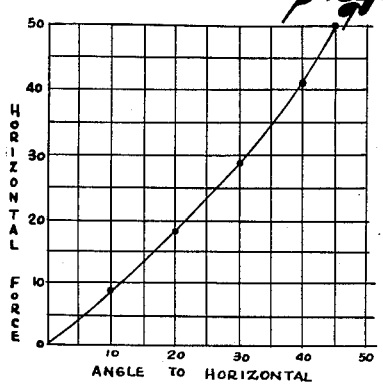
Fig. 7
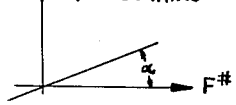
Fig. 8
$F^\# = 50 \tan \alpha$
Fig. 9
INVENTOR.
MARTIN A. HASS
BY
Attorneys

United States Patent Office 3,060,576
Patented Oct. 30, 1962

3,060,576
STABILIZING ARTIFICIAL TOOTH
Martin A. Hass, 1055 El Medio Drive,
Pacific Palisades, Calif.
Filed Jan. 27, 1958, Ser. No. 711,284
12 Claims. (Cl. 32—2)

This invention relates generally to artificial teeth, and more particularly to such teeth that are especially designed to provide a mastication or chewing ability that is substantially equal to that provided by natural teeth, while being held more firmly in the mouth.

In the design of artificial teeth, most attempts heretofore have been upon the basis of duplicating the natural teeth which the artificial teeth are to replace. However, it will immediately be recognized that entirely different conditions exist in the use of the two types of teeth. Thus, natural teeth are rooted, and thus individually firmly connected and anchored to the jaw. Furthermore, as the teeth have developed, and as they have been used over a period of years, the upper and lower teeth have worn to a shape which permits relative movement of the upper and lower jaws in all three axes.

Artificial teeth, on the other hand, are not rooted to the jaw, but instead are mounted in a plate or denture, the upper plate being held in the mouth by the suction between the plate and the roof of the mouth, while the lower plate is held in position by gravity and by a slight amount of suction that is formed between the plate or denture and the gums. Because of the presence of the tongue, the lower plate does not extend completely across the bottom of the mouth, in a manner comparable to that of the upper plate.

One of the problems that has bothered and annoyed wearers of dentures has been the fact that the lower plate tends to wobble or tip when the teeth on one side of the plate engage or crush food, and there is no corresponding food for the teeth on the other side of the plate to engage. Part of this trouble is caused by the fact that when teeth are extracted, the gum tends to shrink more on the cheek or buccal side than on the tongue or lingual side. Consequently, if duplicates of the extracted teeth are placed in the same position as the extracted teeth originally occupied, the upper teeth will provide a downward force that is positioned outwardly of the shrunken gum ridge, thereby providing a couple or turning force that tends to raise the lower teeth on the opposite side of the mouth. As a result, the lower teeth have a tendency to wobble from side to side within the mouth.

In addition, the excessive pressure that is thus developed on one side of the gum tends to cause a physiological deterioration of the tissue of the gum. Consequently, the use of a lower denture such as just described causes further shrinking of the gum and an increased tendency to wobble. The physiological preservation of the tissue of the gum is thus very important, and the teeth of the present invention are designed to reduce the pressure on the gums during chewing to a desirable level. This is accomplished by the particular shape of the chewing or grinding surfaces, and the provision of so-called sluiceways that permit the escape of liquids and comminuted solids.

From the foregoing it will be seen that a major object of the present invention is to provide a new and improved form of artificial tooth that acts to stabilize the plate or denture within the mouth.

Another object of the invention is to provide such a tooth that reduces the pressure on the tissue during the act of chewing to desirable amounts.

Still another object of the invention is to provide a tooth so designed that a downward pressure exerted by a mating upper tooth is converted to a downwardly and inwardly directed force in the lower tooth.

It is a further object of the invention to provide a tooth adapted to cooperate with a mating tooth in such a manner that pressure exerted upon the lower gum by the act of chewing is reduced to a minimum, and the particles of food are easily and properly comminuted.

A still further object of the invention is to provide a tooth construction that permits the normal movement of the lower jaw in all three meridians, as is found in natural teeth.

These and other objects and advantages of the invention will become apparent from the following description of a preferred form thereof, and from the drawings illustrating that form in which:

FIGURE 1 is a perspective view of an upper and lower plate or denture as these would appear when removed from the mouth;

FIGURE 2 is a perspective view of the two lower molars and the two biscuspids enclosed within the indicated area in FIGURE 1;

FIGURE 3 is a cross sectional view of a lower plate or denture constructed in accordance with the present invention, the teeth of the upper jaw being indicated in phantom outline, as are the gum ridges and tongue of the wearer;

FIGURE 4 is a cross sectional view of mating upper and lower molars, with a particle of food therebetween, and with the various forces indicated by arrows;

FIGURE 5 is an elevational view of mating upper and lower molars indicating the so-called sluiceways, and the configuration of the chewing surfaces;

FIGURE 6 is an enlarged diagrammatic view of the chewing surface of a lower tooth indicating the forces and angles involved;

FIGURE 7 is a graph showing how the horizontal force developed by a vertical force varies with the angle;

FIGURE 8 is a diagrammatic illustration of the principle of angularly positioned chewing surfaces; and FIGURE 9 is a simple force diagram illustrating the forces that can tend to wobble the lower plate.

Referring now to the drawings and particularly to FIGURE 1 and 2 thereof, the numeral 20 indicates generally an upper plate or denture, and the numeral 21 indicates a cooperating lower plate or denture. As is well known, the upper plate 20 is molded to fit the gums and roof of the mouth of the individual wearer so that a firm contact is provided, and the plate is retained in the mouth by what is commonly referred to as suction between the plate and the roof of the mouth. The lower plate 21 is molded to fit the gums of the individual wearer, but since the tongue extends between the two sides of the mouth, the central portion of the lower plate is omitted, and in plan view, the lower plate has a generally U-shaped appearance. While a certain amount of suction can be provided by the portion of the lower plate 21 that bears against the gums, this is considerably less than can be provided between the upper plate and the roof of the mouth. Users generally find that the upper plate fits rather tightly, without any tendency to move or wobble, but that the lower plate rocks or wobbles and is generally more uncomfortable.

Mounted in the upper plate 20 and the lower plate 21 are artificial teeth, and an enlarged view of four of these teeth, two molars and two biscuspids, is shown in FIGURE 2. It will be noted that the two bicupsids, 22 and 23, as well as the first molar 24, are shown in solid outline, while the second molar 25 is indicated in phantom outline, for reasons that will appear hereinafter. It will be noted that the upper or chewing surfaces of the teeth 22 to 25 are provided with grooves and ridges not unlike natural teeth, and differ in this respect from certain prior artificial teeth that have used flat or plane surfaces.

In FIGURE 3 there is shown a cross sectional view through the lower plate 21, taken through the first molar 24 and showing the corresponding molar 24a on the opposite side of the plate. In this FIGURE, it will be seen that the teeth 24 and 24a are mounted in a denture base material 26 that is shaped to fit comfortably upon the gum ridges 27 and 28, thus holding and supporting the teeth in the proper manner. The denture base material 26 is usually colored and shaped to simulate the appearance of the natural gum, and all of the artificial teeth, including the bicuspids 22 and 23, the molars 24 and 25, and any other teeth included in the lower plate 21 are mounted in this denture base. Also shown in FIGURE 3 are arrows indicating forces acting upon the teeth, these forces being developed when the lower teeth 24 and 24a are pressed against the corresponding teeth 30 and 30a. It will be realized that the lower jaw of a person is moved upwardly so that the lower teeth push upwardly, against the upper teeth, but it is preferable in the present instance to think of the upper teeth as pressing down on the lower teeth, since the forces and concepts are somewhat simpler and more readily understood.

The upper or chewing surface, properly known as the occlusal surface, of the teeth 24 and 24a has a groove 31 formed therein that extends generally parallel to the gum ridges 27 and 28. As indicated in FIGURE 4, the groove 31 helps to retain a piece or bolus of food on the occlusal surface of the lower tooth 24 so that it may be properly comminuted by the action of the upper tooth 30. The cheeks and tongue of the person act to move the food into the proper position upon the lower teeth, as is well known in dentistry, and the groove 31 aids in retaining the food 32 in this proper position. The groove 31 has other characteristics and provides other features, not the least of which is the stabilizing action that retains the lower plate 21 in position without wobbling.

As indicated in FIGURES 3 and 4, the groove 31 is formed by two downwardly converging surfaces, a buccal or outer surface 33 and a lingual or inner surface 34. The angle that the buccal surface 33 makes with the generally downwardly directed force provided in the closing of the jaws and chewing of food, is different from the angle that the lingual surface 34 makes with that force. For convenience, the major force developed between the upper and lower teeth is considered to be a vertical force, and a plane perpendicular to that force, as well as the plane defined by the upper surface of the gum ridges 27 and 28, is considered to be a horizontal plane. In view of this, the lingual plane 34 may be considered as making a different angle with the horizontal than the buccal plane 33.

When a vertically directed force 35 is applied to the groove 31 of the tooth 24, the inclined planes constituting the buccal surface 33 and the lingual surface 34 act to produce horizontal components of force in opposite directions. Thus the force acting upon the buccal surface 33 may be considered as generally downward, but with a horizontal component directed outwardly, toward the cheek. Similarly, the force exerted upon the lingual surface 34 may be considered to be generally downwardly, but with a horizontal component directed inwardly, toward the tongue. The magnitude of the horizontal component in each case, assuming a constant vertical force, is a function of the angle that the inclined plane makes with the horizontal. Thus, if the inclined plane makes an angle of zero degrees with the horizontal, or expressed differently, is horizontal, the downwardly directed force will provide no horizontal component of force. Likewise, if the inclined plane makes an angle of 45° with the horizontal plane, the horizontal component of force will be equal to the vertical component of force. Mathematically, this is illustrated in FIGURES 7 and 8, where a downwardly directed force of 50 pounds is considered as acting upon an inclined plane located at an angle alpha to the horizontal. The horizontally directed component F in pounds is seen to be equal to 50, the downwardly directed force in pounds, multiplied by the tangent of alpha.

As previously mentioned, the angle alpha formed by the buccal surface 33 is different from the angle alpha formed by the lingual surface 34. In FIGURE 6, this relationship is indicated for a buccal plane angle of 4°, and a lingual plane angle of 8°. From FIGURES 7 and 8, it may be determined that for a downwardly directed force of 50 pounds, when the angle alpha equals 4°, there will be a horizontally directed component of force of approximately 3½ pounds. When the angle alpha is equal to 8°, there will be a horizontally directed force of approximately 7 pounds. Since the buccal surface 33 and the lingual surface 34 are on the same tooth 24, the net result will be that this tooth experiences a downwardly directed force of 50 pounds and an inwardly directed horizontal force of approximately 3½ pounds. Referring again to FIGURE 3, the net inwardly directed horizontal force acts upon the tooth 24 a distance above the gum ridge 27, this inwardly directed horizontal force, applied above the gum ridge 27, thus tends to rotate the lower denture 21 about the gum ridge, though it will be realized that no actual rotation normally occurs. On the other hand, the horizontal force provides a couple that causes the opposite side of the denture 21 to remain firmly seated upon the opposite gum ridge 28, thereby preventing wobbling of the denture as mastication or chewing continues. Consequently, should the downwardly directed force 35 be located outwardly, toward the cheek, from the gum ridge 27, thus producing a torque tending to rotate the lower denture 21 in the opposite directions so that the denture tends to raise from the opposite gum ridge 28, the inwardly directed horizontal component provided by the planes 33 and 34 counteract this torque and prevent any such rotation or wobbling. The same effect is provided when a particle or bolus of food 32 is located within the groove 31, since the downwardly directed force is applied through the bolus of food, rather than directly by the upper tooth 30. In each case, it will be recognized that the angles formed by the buccal and lingual planes 33 and 34, respectively, provide the desired inwardly directed resultant force. The same action occurs on the tooth 24a, so that regardless of which side of the mouth contains food, the lower denture 21 is held firmly in place.

It would be possible, of course, to make a set of dentures in which the downwardly directed force 35 is applied to the lower tooth 24 at a point inwardly from the gum ridge 27. However, to accomplish this, while still retaining the proper mechanical strength of the tooth 24 and the corresponding upper tooth 30, requires the moving of the tooth 24 inwardly, toward the tongue. When this is done, new problems arise. Because of the restricted space then left for the tongue, the denture is not comfortable, and movement of the tongue tends to raise the denture from the gum ridges 27 and 28. If the dentures are made and fitted so that a simple downward thrust is directed to the tops of the gum ridges 27 and 28, there is little tendency for the denture 21 to wobble. However, the gum ridges have a tendency to shrink after the denture has been fitted, and most of this shrinkage occurs on the outer or buccal side of the ridge. Consequently, a condition comparable to that shown in FIGURE 9 arises. In that figure, a beam 41 is shown that corresponds in mechanical effect to the complete lower denture 21. The beam 41 is supported by what may be considered fulcrums 42 and 43, corresponding to the gum ridges 27 and 28, respectively. A downwardly directed force 44 is applied at one end of the beam 41, over an alternate position of the fulcrum 42, and indicated by the numeral 42a. When the fulcrum is in the position 42a, the downwardly directed force 44 provides no torque tending to raise the opposite end of the beam 41 from the fulcrum 43. However, as the first fulcrum is shifted inwardly, corresponding to the shrinkage of the gum ridge 27, the force 44 is applied outwardly of the fulcrum 42, and under these conditions, the beam 41 has a tendency to lift from the fulcrum 43, thus providing the tipping or wobbling that is so undesirable in a denture.

To aid in cutting or chopping the food 32 between the upper tooth 30 and the lower tooth 24, the corresponding planes of the upper tooth 30 are inclined slightly more to the horizontal than the planes 33 and 34 of the lower tooth. Thus, if the buccal plane 33 of the lower tooth 24 is at an angle of 4° to the horizontal, the corresponding buccal plane of the upper tooth 30 would normally be at an angle in the general neighborhood of 5° to the horizontal. Similarly, the lingual plane of the upper tooth 30, corresponding to the lingual plane 34 of the lower tooth 24, would make an angle of approximately 9° to the horizontal if the plane 34 makes an angle of 8° to the horizontal. This gives the upper tooth 30 a wedgelike action that aids in cutting the bolus of food, so that less pressure need be exerted by the jaws in reducing the food. It will be realized that this is the same principle used in most cutting tools, where a sharp cutting blade reduces the pressure that must be applied to force the blade into the material. While this seems like an elementary concept, it is of particular importance in dentures, since the reduction of pressure upon the gum tissue permits better chewing and improved tissue condition. It will be appreciated that if the pressure exerted by the lower denture upon the gum is too great, the gum will become sore, and will additionally shrink. Consequently, the use of the wedge type cutting action improves the dental health of the wearer.

The wedge shape of the surfaces of the upper tooth 30 provides another advantage in that it permits the jaw of the patient to be moved from side to side, as is the case with natural teeth, thereby giving both a more natural feeling and permitting the grinding of certain harder portions of food. This grinding action may be compared to the action of a mortar and pestle, and is augmented by the fact that the upper and lower teeth 24 and 30 are shaped or cusped in such a manner, as illustrated in FIGURE 5, that a certain amount of forward and backward, or anterior and posterior, movement of the jaw is possible. Normally the upper and lower teeth come together with the apex of the buccal and lingual planes of the upper tooth aligned with the bottom of the groove 31 formed by the intersection of the buccal and lingual planes 33 and 34 of the lower tooth 24. Similarly, the cusps of the upper and lower teeth are aligned with the corresponding recesses in the opposite teeth. However, it is possible to move the lower jaw backwardly and forwardly, just as it is with natural teeth, and thus provide an additional grinding or mortar and pestle action. The lateral movement, combined with the forward and backward movement, permits complete comminuting of food by tearing, crushing, and grinding.

In forming the lower tooth 24 and the upper tooth 30, escape passages or sluiceways 50 are formed in the teeth to permit the escape of fluids and comminuted food released from the bolus of food being chewed. In this way, excessive pressures are not built up when the jaws are closed, but instead mastication proceeds in the normal manner. It will be recognized that many foods contain a large amount of liquid in them, such as fruits, and when these foods are crushed, the liquid is forced out and unless provision is made for the escape of the liquid, the pressure exerted by the teeth reaches a high value before the remainder of the food is completely crushed. However, by providing the sluiceways 50, the liquid that is forced out is given an opportunity to escape, and the fibrous material remaining can be crushed and ground without excessive pressure being exerted. This also makes for more efficient mastication of food.

Artificial teeth are usually made by suppliers who furnish the teeth, and, except in rare instances, are not made by the dentist who fits the teeth to the patient. Dental laboratories mount the teeth provided by the supplier in the denture base material, carefully aligning the teeth so that proper occlusion occurs. The teeth can be supplied as individual teeth, or can be supplied in groups. With the present teeth, it is generally preferable to furnish the bicuspids 22 and 23 and the first molar 24 as a single unit or group, with all of the teeth properly aligned with each other. This block or group may then be mounted in the denture base material with a minimum of efforts at alignment. Some dentists do not wish to use the second molar 25, since they feel that this places an additional load upon the gum tissue, and consequently the second molar is preferably not included in the group or block of teeth. However, it can be readily supplied as an additional tooth that is mounted in the denture base material and properly aligned with the other teeth.

The remarks that have been made regarding the lower tooth or molar 24 and the other teeth apply with equal effect to the opposite lower molar 24a, and the corresponding teeth on the other side of the mouth. The lower denture 21 is a complete unit in which the forces created in chewing should be balanced on both sides of the mouth, and consequently the problems and solutions discussed with respect to the teeth on one side apply with equal force to the teeth on the other side.

The teeth of the present invention are designed and intended primarily for use with a cooperating upper denture 20, since the maximum advantages are secured when complete upper and lower dentures are designed to cooperate with each other. However, if the dentures are partial dentures, with some of the natural teeth in the central or front portion of the mouth remaining, the same advantageous results can be secured by the use of this invention. Furthermore, if the entire complement of natural upper teeth remain, but a lower denture must be provided, it is possible to form the lower teeth so that the same beneficial results are obtained. However, this requires special shaping and forming of the occlusal surfaces, and it will be appreciated that better results can be obtained, so far as the rocking and wobbling of the lower dentures is concerned, when both the upper and lower denture are constructed in accordance with this invention.

Where the upper and lower dentures are properly constructed, the lingual cusps of the upper teeth have a smaller radius than the central fossae or grooves of the lower teeth, the cutting of food is easily accomplished by the wedge-like action of the upper teeth, while the grinding is accomplished as previously mentioned. This permits a certain freedom of movement, both while the jaws are being closed, and when they are closed. Such freedom of movement is particularly important because of differences in the chewing habits and characteristics of different individuals. In each case, however, the action of the inclined planes is to stabilize the lower denture, and this stabilizing action occurs while the teeth are cutting and crushing the food, before the upper and lower teeth actually contact each other. In this connection, while angles of four degrees and eight degrees have been mentioned, providing a net inwardly-directed force of approximately three and one-half pounds for a downwardly-directed force of fifty pounds, or about seven percent of the downwardly-directed force, it will be appreciated that the angles and corresponding percentage value of the inwardly-directed force may be varied. Thus, the net inwardly-directed horizontal force may vary from approximately three to approximately twelve percent of the downwardly-directed force. This means that with a buccal plane angle of substantially 4°, the lingual plane angle may vary from approximately 6° to approxamtely 11°.

To secure the maximum benefits from the teeth herein described, the outer or buccal cusps of the upper teeth should not contact the lower teeth, and thus the full effect of the stabilizing planes will be realized. When the teeth are closed, all of the upper lingual cusps should bear against the corresponding fossae in the lower teeth so that both the upper and lower denture experience a minimum of strain, while the lower denture is stibilized in position.

From the foregoing, it will be seen that there has been provided a new form of tooth fully capable of securing the advantages and achieving the objects heretofore set forth. While a preferred form of the invention has been shown and described, it will be appreciated that modification may be made without departing from the broad concepts herein disclosed. Consequently, the invention is not to be restricted to the particular form or arrangement of parts, nor to specific values or angles given, except as limited by the following claims.

I claim:

1. An artificial tooth of the class described which includes: a body portion adapted to be anchored in a denture base material forming a lower denture extending on both sides of the lower jaw; and an occlusal portion mounted on said body portion, said occlusal portion having buccal and lingual occlusal surfaces each making an angle with the horizontal and both adapted to be contacted by a substantially vertically aligned cooperating tooth to apply vertical forces to said occlusal surfaces, said buccal occlusal surface making an angle of substantially 4° with the horizontal and said lingual occlusal surface making an angle substantially between 6° and 11° with the horizontal.

2. An artificial tooth of the class described which includes: a body portion adapted to be anchored in a denture base material forming a lower denture extending on both sides of the lower jaw; and an occlusal portion mounted on the upper surface of said body portion, said occlusal portion having buccal and lingual occlusal surfaces each at an angle to the horizontal, cooperating to form a groove in the upper surface of said occlusal portion, aligned with the gum ridge, and located to be contacted by the lingual cusp of a substantially vertically aligned cooperating tooth to apply a vertical force to said occlusal surfaces, said lingual occlusal surface making an angle with the horizontal of substantially 6° to 11° and said buccal occlusal surface making a lesser angle with the horizontal than said lingual occlusal surface, whereby said vertical force produces both buccally and lingually directed forces but with a net resultant horizontal force directed lingually and applied to said occlusal portion to provide a torque tending to seat said denture on the other side of the jaw.

3. An artificial tooth of the class described which includes: a body portion adapted to be anchored in a denture base material forming a lower denture extending on both sides of the lower jaw; and an occlusal portion on the upper end of said body portion, having buccal and lingual cusps, and having buccal and lingual occlusal surfaces cooperating to form a horizontal groove in the upper surface of said occlusal portion extending in a direction generally parallel to the gum ridge underlying said tooth, said buccal and lingual surfaces being positioned to be contacted at said groove by a substantially vertically aligned lingual cusp of a cooperating tooth which applies a vertical force to said surfaces, said lingual occlusal surface making an angle with the horizontal of substantially 6° to 11° and said buccal occlusal surface making a lesser angle with the horizontal than said lingual occlusal surface, whereby said vertical force produces an outwardly directed horizontal force on said buccal surface and a greater inwardly directed horizontal force on said lingual surface to provide a net resultant horizontal force that is directed lingually and applied to said occlusal portion, said vertical force acting to seat said denture on the side of the jaw on which said force is applied, and said net resultant horizontal force providing a torque acting simultaneously to seat said denture on the other side of the jaw.

4. An artificial tooth of the class described which includes: a body portion adapted to be anchored in a predetermined position in a denture base material having other teeth therein and forming a lower denture extending on both sides of the lower jaw; and an occlusal portion on the top of said body portion, having buccal and lingual cusps, and having buccal and lingual occlusal surfaces each at a different angle to the horizontal and forming a single horizontal groove in the upper surface of said occlusal portion, said groove extending generally in the direction of the gum ridge underlying said tooth and aligned therewith, said buccal and lingual occlusal surfaces being so positioned with respect to each other and said denture that said lingual surface makes an angle with the horizontal of substantially 8° and said buccal surface makes an angle with the horizontal of substantially 4°, said lingual and buccal surfaces being positioned to be contacted by a generally vertically aligned lingual cusp of a cooperating tooth which applies a vertical force to said surfaces to produce both a horizontal and a vertical force on said buccal and said lingual surfaces, providing a vertical force and a net resultant horizontal force that is directed lingually and applied to said occlusal portion to produce a torque tending to rotate said denture about the gum ridge underlying said tooth and in a direction to seat the portion of said denture on the other side of said jaw, while said vertical force tends to seat said denture on the portion of said gum ridge underlying said tooth.

5. A pair of cooperating dentures of the class described which includes: an upper denture base member; a tooth having a body portion anchored in said base member and having an occlusal portion with buccal and lingual cusps; a lower denture base member; and a lower tooth having a body portion anchored in said lower denture base member, and having an occlusal portion with buccal and lingual cusps, said cusps on said lower tooth being joined by buccal and lingual occlusal surfaces each at an angle to the horizontal and meeting to form a groove aligned with the lingual cusps of said upper tooth, said lingual occlusal surface making a greater angle with the horizontal than said buccal occlusal surface, whereby the vertical force provided by the engagement of said lingual cusp of said upper tooth in said groove of said lower tooth produces a vertically downwardly directed force on said lower tooth and a lingually directed net resultant horizontal force on said lower tooth.

6. A pair of dentures as defined in claim 5 in which the surface of said lingual cusp of said upper tooth is coordinated with said occlusal surfaces and groove of said lower tooth to prevent locking of said teeth, whereby said lower tooth may be moved forward and backward as well as sideways with respect to said upper tooth and while occluded therewith.

7. A pair of dentures as defined in claim 5 in which said groove in said lower tooth is aligned with the gum ridge of the lower jaw.

8. A pair of dentures as defined in claim 5 in which the angle made by said lingual occlusal surface with the horizonal is substantially between 6° and 11°.

9. A pair of dentures as defined in claim 6 in which said groove in said lower tooth is aligned with the gum ridge of the lower jaw.

10. A cooperating pair of upper and lower dentures which includes: an upper denture base member; an upper tooth mounted in said upper member and having a lingual and a buccal cusp; a lower denture base member; and a lower tooth mounted in said lower member in a position cooperating with said upper tooth and having a lingual and a buccal cusp with lingual and buccal occlusal surfaces between said cusps, said lingual occlusal surface making a greater, and said buccal occlusal surface making a smaller angle with the horizontal, said surfaces forming a fossa into which the lingual cusp of said upper tooth extends, the buccal cusp of said upper tooth being located outwardly of the buccal cusp of said lower tooth, the vertical pressure of the lingual cusp of said upper tooth producing a vertically directed downward force on said lower tooth and a net resultant lingually directed horizontal force on said lower tooth, provided by an outwardly directed force on said buccal occlusal surface and a greater inwardly directed force on said lingual occlusal surface, said downward force on said lower tooth being applied in substantial alignment with the gum ridge of the lower jaw.

11. A pair of dentures as defined in claim 10 in which the angle made by said buccal occlusal surface with the horizontal is substantially 4° and the angle made by said lingual occlusal surface with the horizontal is substantially between 6° and 11°.

12. A pair of dentures as defined in claim 11 in which the opposed occlusal surfaces of the upper and lower teeth diverge at substantially 1°.

References Cited in the file of this patent

UNITED STATES PATENTS

| | | |
|---|---|---|
| 2,095,432 | Brenner | Oct. 12, 1937 |
| 2,203,226 | Klicka | June 4, 1940 |
| 2,717,445 | Ford | Sept. 13, 1955 |